June 12, 1951     H. MODDERMAN     2,556,548
SLIDABLY ADJUSTABLE SAW TABLE GUIDE FENCE
Filed July 11, 1947
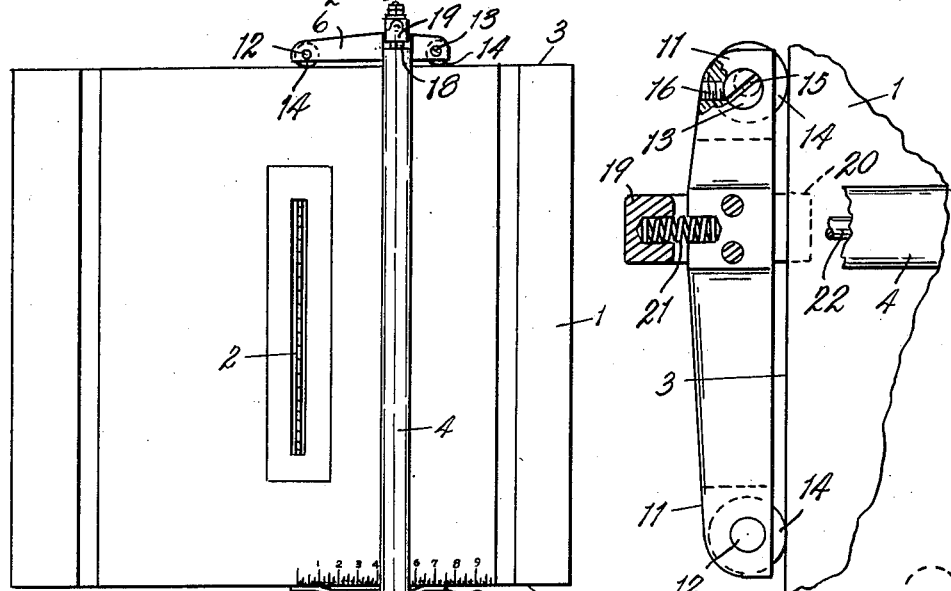
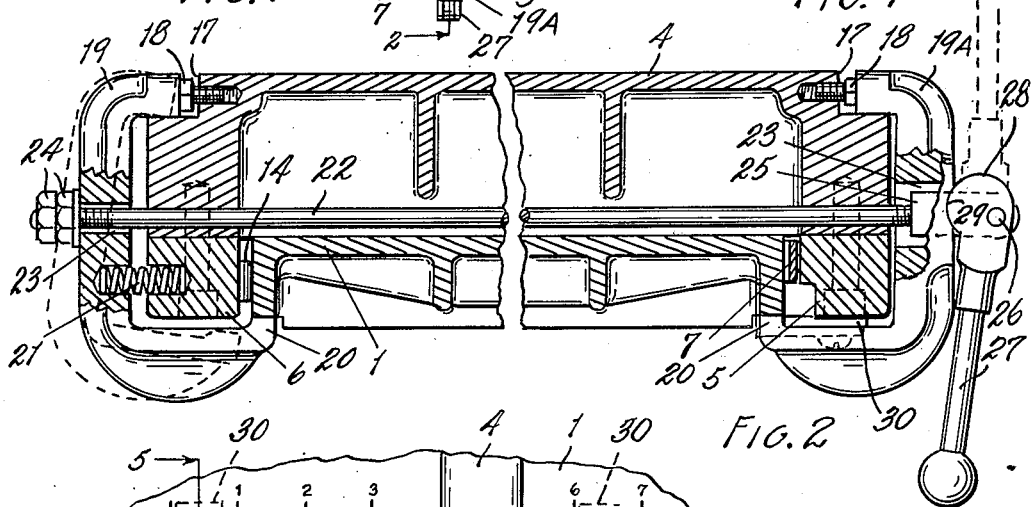
INVENTOR.
Helmer Modderman
BY
Attorney.

Patented June 12, 1951

2,556,548

UNITED STATES PATENT OFFICE 2,556,548

SLIDABLY ADJUSTABLE SAW TABLE GUIDE FENCE

Helmer Modderman, Kalamazoo, Mich., assignor to Atlas Press Company, Kalamazoo, Mich.

Application July 11, 1947, Serial No. 760,381

10 Claims. (Cl. 143—174)

This invention relates to improvements in a slidably adjustable saw table guide fence.

The principal objects of this invention are:

First, to provide a novel form of fence for guiding work on a saw table which may be clamped in accurately maintained perpendicular relationship to the edges of the saw table.

Second, to provide a fence which may be easily moved along a saw table to vary the distance between the saw and the fence.

Third, to provide a saw table fence with table engaging cross pieces for widening the base of engagement between the fence and the table and preventing misalignment of the fence on the table.

Fourth, to provide novel means for adjusting the perpendicular relationship between a fence and a saw table.

Fifth, to provide novel clamping means for clamping a fence to a saw table which operates to quickly free the fence from the table for adjustment thereon or removal therefrom and to tightly clamp the fence in any adjusted position.

Other objects and advantages pertaining to the details and economies of the invention will be apparent from the following description and claims.

The drawings, of which there is one sheet, illustrate a preferred form of my fence as applied to the table of a circular saw.

Fig. 1 is a plan view of a saw table with my fence in operative position thereon.

Fig. 2 is a fragmentary vertical cross sectional view along the line 2—2 in Fig. 1.

Fig. 3 is an enlarged fragmentary plan view, partially broken away, of the forward end of the fence.

Fig. 4 is an enlarged fragmentary plan view, partially broken away, of the rear end of the fence.

Fig. 5 is a fragmentary cross-sectional view along the line 5—5 of Fig. 3.

The drawings illustrate a saw table 1 of more or less standard design having a circular saw 2 mounted therebelow and projecting upwardly through a slot in the table. As is standard practice in saw tables of this type, the front and rear edges 3 of the table are parallel and perpendicular to the plane of the saw 2. My fence consists of a rail portion 4 which is of hollow ribbed construction and which is provided with a forward T member 5 and a rear T member 6 secured to the underside of the front and rear ends of the rail.

The front T member 5 is opposed to the front edge of the saw table 1 when the fence is installed on the saw table and is provided with a slide bar 7 having inwardly offset ends 8 arranged to bear against the edge of the saw table. A pair of pins 9 extending through the T member 5 slidably secure the slide bar to the T member and coil springs 10 are provided for constantly urging the slide bar against the saw table.

The rear T member 6 is provided with bifurcated ends 11 which support pins 12 and 13 for rotatably supporting rollers 14 in rolling engagement with the rear edge of the table 1. The pin 13 is provided with an eccentric bearing for the roller 14 and is slotted as at 15 so that the pin may be turned in the T member to vary the position of the roller with respect to the T member. A set screw 16 is provided for clamping the pin in adjusted position. By turning the pin 13 the angular relationship between the rear T member 6 and the rear edge of the table 1 may be varied slightly to maintain accurate parallel relationship between the rail 4 and the saw 2.

As is most clearly shown in Fig. 2 the top of the rail 4 is provided with shouldered ends 17 in which are mounted cap screws 18 for adjustably engaging the upper legs of C members 19 and 19A. The lower legs of the C members extend forwardly and upwardly as at 20 and are arranged to be clamped against the under side of the front and rear edges of the saw table 1. A coil spring 21 is positioned in sockets provided therefor in the rear C member and rear T member 6 to constantly urge the rear C member backwardly out of engagement with the table 1. The C members are loosely carried on the rail 4 by means of a clamp bar 22 which extends longitudinally through the rail 4 and extends through apertures 23 in the mid sections of the C members. The rear end of the clamp bar 22 is provided with lock nuts 24 and the forward end of the clamp bar is provided with a block 25 supporting a pivot pin 26.

The pivot pin 26 rotatably supports the bifurcated end of a clamp lever 27, the bifurcations of which are formed with eccentric cam surfaces 28 arranged to bear against the milled surface 29 in the C member 19A. When the clamp lever 27 is in lowered position as shown in full lines the cam surfaces 28 will urge the forward C member 19A rearwardly into clamping engagement with the cap screw 18 on the front of the rail and with the under side of the forward edge of the saw table. The clamp rod 22 will be drawn forwardly similarly clamping the rear C member 19 against the rear cap screw 18 and the under side of the rear edge of the saw table. When the clamp lever 27 is thrown upwardly as shown by the dotted lines in Fig. 2, the clamping action between the cam surfaces 28 and the forward C member 19A will be relieved and the coil spring 21 will throw the rear C member rearwardly out of engagement with the saw table as indicated by the dotted lines. The entire fence structure may then be either removed from the saw table or moved along the table to any desired adjusted position relative to the saw. My fence is thus easily and quickly adjusted on the saw table and clamped thereto and is adjustable to maintain a high degree of parallelism between the rail portion of the fence and the saw. At the same time the fence is rugged in construction so as to give highly satisfactory service under hard usage.

In order to prevent transverse tilting of the fence on the saw table I provide shoes 30 which are screwed to bosses 31 formed on the bottom of the ends of the front T member 5. (See Fig. 5.) The shoes 30 and bosses 31 are proportioned so that the tops of the shoes will have a snug sliding fit with the bottom of the front edge of the table when the fence is installed on the table. Dowels 32 are provided for properly aligning the shoes. Since the shoes are laterally spaced at the ends of the T member, they effectively prevent tilting of the T member and slide. They are easily disengaged from the saw table by loosening the clamp lever 27 and drawing forward on the fence 4. The fence and front T member may then be raised up to remove the fence from the saw table.

I have thus described a highly practical commercial embodiment of my fence and have not attempted to show possible modifications thereof as it is felt that persons skilled in the art may make such modifications therein as are desired without further disclosure.

Having thus described my invention, what I claim as new and desire to secure by Letters Patent, is:

1. Fence structure for use on a saw table having parallel front and rear edges comprising a rail member of hollow ribbed construction arranged to rest on said table, front and rear T members secured to the underside of the front and rear ends of said rail and perpendicular thereto, said rear T member having bifurcated ends supporting pivot pins, an eccentric bearing on one of said pivot pins, rollers mounted on said pins and arranged to bear against the rear edge of said table, clamping means for holding said eccentric bearing in adjusted position, a slide bar slidable normal to the rear edge of said front T member and spring urged toward engagement with the front edge of said table, shoulders formed on the front and rear ends of said rail member and having screws positioned in the vertical faces thereof, front and rear C members having upper arms arranged to bear against said screws and lower arms arranged to bear against the underside of said saw table, a clamp rod extending through said rail member and through said C members, retaining means on the rear end of said clamp rod for retaining said rear C member thereon, a block threaded on the front end of said clamp rod and carrying a pivot pin, a clamp lever having a bifurcated end pivotally mounted on said pin, the bifurcated ends of said clamp lever having eccentric cam surfaces engageable with said front C member, and a spring positioned between said rear C member and rear T member.

2. Fence structure for use on a saw table having parallel front and rear edges comprising a rail member arranged to rest on said table, front and rear T members secured to the underside of the front and rear ends of said rail and perpendicular thereto, said rear T member having bifurcated ends supporting pivot pins, an eccentric bearing on one of said pivot pins, rollers mounted on said pins and arranged to bear against the rear edge of said table, clamping means for holding said eccentric bearing in adjusted position, a slide bar slidable normal to the rear edge of said front T member and spring urged toward engagement with the front edge of said table, shoulders formed on the front and rear ends of said rail member and having screws positioned in the vertical faces thereof, front and rear C members having upper arms arranged to bear against said screws and lower arms arranged to bear against the underside of said saw table, a clamp rod extending through said rail member and through said C members, retaining means on the rear end of said clamp rod for retaining said rear C member thereon, a clamp lever pivotally mounted on the front of said rod, said clamp lever having eccentric cam surfaces engageable with said front C member, and a spring positioned between said rear C member and rear T member.

3. Fence structure for use on a saw table having parallel front and rear edges comprising a rail member arranged to rest on said table, front and rear T members secured to the front and rear ends of said rail and perpendicular thereto, said rear T member supporting pivot pins on each end thereof, an eccentric bearing on one of said pivot pins, rollers mounted on said pins and arranged to bear against the rear edge of said table, clamping means for holding the eccentric bearing in adjusted position, a slide bar mounted on the rear edge of said front T member and spring urged toward engagement with the front edge of said table, front and rear C members having upper arms arranged to bear against said rail and lower arms arranged to bear against the underside of said saw table, a clamp rod extending through said rail member and through said C members, retaining means on the rear end of said clamp rod for retaining said rear C member thereon, and a clamp lever pivotally mounted on the front of said rod, said clamp lever having an eccentric cam surface engageable with said front C member.

4. Fence structure for use on a saw table having parallel front and rear edges comprising a rail member arranged to rest on said table, front and rear T members secured to said rail and perpendicular thereto, rollers mounted on said rear member and arranged to bear against the rear edge of said table, one of said rollers being eccentrically adjustable on said T member, clamping means for holding said adjustable roller in adjusted position, a slide bar mounted on said front T member and spring urged toward engagement with the front edge of said table, front and rear C members having upper arms arranged to bear against said rail and lower arms arranged to bear against the underside of said saw table, a clamp rod extending through said rail member and through said C members, retaining means from the rear ends of said clamp rod for retaining said rear C member thereon, and a clamp lever pivotally mounted on said rod, the end of said clamp lever having an eccentric cam surface engageable with said front C member.

5. Fence structure for use on a saw table having parallel front and rear edges comprising a rail member arranged to rest on said table, front and rear T members secured to said rail and perpendicular thereto, rollers mounted on said rear member and arranged to bear against the rear edge of said table, a slide bar mounted on said front T member and spring urged toward engagement with the front edge of said table, front and rear C members having upper arms arranged to bear against said rail and lower arms arranged to bear against the underside of said saw table, a clamp rod extending through said rail member and through said C members, retaining means from the rear ends of said clamp rod for retaining said rear C member thereon, and a clamp lever pivotally mounted on said rod, the end of said clamp lever having an eccentric cam surface engageable with said front C member.

6. Fence structure for use on a saw table having parallel front and rear edges comprising a rail member adapted to rest upon said saw table, front and rear T members secured to the underside of the front and rear ends of said rail member, a spring pressed slide plate carried by one of said T members and arranged to bear against an edge of the table, rollers carried on the ends of the other of said T members and arranged to roll along another edge of said table, one of said rollers having an eccentric bearing mounting on said other T member whereby said last mentioned roller may be adjusted toward and away from said table, C members having upper arms arranged to engage the ends of said rail member and lower arms arranged to engage said table, a clamp bar extending through said rail member and C members, and a clamping lever pivoted on said clamp bar and having a cam surface engageable with one of said C members for clamping said fence to said table.

7. Fence structure for use on a saw table having parallel front and rear edges comprising a rail member adapted to rest upon said saw table, front and rear T members secured to the front and rear ends of said rail member in opposed relationship to the edges of said table, rollers carried on one of said T members and arranged to roll along the edge of said table, one of said rollers having an eccentric bearing mounting on said T member whereby said last mentioned roller may be adjusted toward and away from said table, C members having upper arms arranged to engage the ends of said rail member and lower arms arranged to engage said table, a clamp bar extending longitudinally of said rail member and through said C members, and a clamping lever pivoted on said clamp bar and having a cam surface engageable with one of said C members for clamping said fence to said table.

8. Fence structure for use on a saw table having parallel front and rear edges comprising a rail member of hollow ribbed construction arranged to rest on said table, front and rear T members secured to the underside of the front and rear ends of said rail and perpendicular thereto, said rear T member having bifurcated ends supporting pivot pins, an eccentric bearing on one of said pivot pins, rollers mounted on said pins and arranged to bear against the rear edge of said table, clamping means for holding said eccentric bearing in adjusted position, a slide bar slidable normal to the rear edge of said front T member and spring urged toward engagement with the front edge of said table, shoulders formed on the front and rear ends of said rail member and having screws positioned in the vertical faces thereof, front and rear C members having upper arms arranged to bear against said screws and lower arms arranged to bear against the underside of said saw table, a clamp rod extending through said rail member and through said C members, retaining means on the rear end of said clamp rod for retaining said rear C member thereon, a block threaded on the front end of said clamp rod and carrying a pivot pin, a clamp lever having a bifurcated end pivotally mounted on said pin, the bifurcated ends of said clamp lever having eccentric cam surfaces engageable with said front C member, a spring positioned between said rear C member and rear T member and rearwardly projecting shoes secured to the bottom of the ends of said front T member and arranged to engage the bottom of the front edge of said saw table.

9. Fence structure for use on a saw table comprising a rail member arranged to rest upon said table, a T member secured to one end of said rail member in opposed relationship to the edge of said table, a slide bar slidably mounted on said T member in opposed relationship to the edge of said table and having inwardly offset ends arranged to bear horizontally against the vertical edge of said table at points spaced laterally from said rail member, spring members urging said slide member toward engagement with said saw table, clamping means carried by said rail member for clamping said slide member and T member against said table, and shoe members secured to the bottom of the ends of said T member and having horizontally unobstructed flat surfaces arranged to engage the bottom of the edge of said saw table at points spaced laterally from said rail to prevent tilting thereof and to be slidably disengageable from said table by longitudinal movement of said rail member.

10. A fence for use on a work table comprising a rail member arranged to seat upon the top of said table, a T member secured to one end of said rail member, means on said T member arranged to engage a vertical side edge of said table horizontally at points spaced laterally from the axis of said rail member, and shoe members secured to the bottom of the ends of said T member and having horizontally unobstructed flat surfaces arranged to engage the bottom of the edge of said saw table at points spaced laterally from said rail to prevent tilting thereof and to be slidably disengageable from said table by longitudinal movement of said rail member.

HELMER MODDERMAN.

REFERENCES CITED

The following references are of record in the file of this patent:

UNITED STATES PATENTS

| Number | Name | Date |
|---|---|---|
| 623,156 | Humphrey | Apr. 18, 1899 |
| 915,496 | Sodergren | Mar. 16, 1909 |
| 2,037,283 | Strachan et al. | Apr. 14, 1936 |
| 2,106,288 | Tautz | Jan. 25, 1938 |
| 2,140,323 | Lonskey | Dec. 13, 1938 |
| 2,265,335 | Aumann | Dec. 9, 1941 |
| 2,273,715 | Lonskey et al. | Feb. 17, 1942 |
| 2,374,286 | Hargadon | Apr. 24, 1945 |